United States Patent Office 3,496,275
Patented Feb. 17, 1970

3,496,275
METHOD OF TREATMENT OF NERVOUS TENSIONS IN MAMMALS WITH CERTAIN SUBSTITUTED INDOLES AND INDOLINES
Michel Leon Thominet, Paris, France, assignor to Société d'Etudes Scientifiques et Industrielles de l'Ile-de-France, Paris, France
No Drawing. Continuation-in-part of application Ser. No. 669,297, Sept. 20, 1967. This application Aug. 8, 1968, Ser. No. 751,045
Claims priority, application France, July 25, 1961, 869,013, 869,014
Int. Cl. A61k 27/00
U.S. Cl. 424—274                6 Claims

ABSTRACT OF THE DISCLOSURE

Nervous tension in mammals is significantly lessened by the administration of certain substituted indoles and indolines. Treatment may be given orally or parenterally.

---

This application is a continuation-in-part of application Ser. No. 669,297, filed Sept. 20, 1967, now U.S. Patent No. 3,415,934. The application S.N. 669,297 was a continuation-in-part application of an application S.N. 466,070, filed June 15, 1965, now abandoned, and this latter application was a divisional application of U.S. patent application S.N. 210,555, filed July 17, 1962, now U.S. Patent No. 3,198,807.

This invention relates to the treatment of emesis or nervous tension in mammals by the administration of substituted carboxamide indoles or the corresponding indolines of such indoles.

The substituted carboxamide indoles utilized in the methods of treatment of this invention have the formula:

[structure: indole with -A at 3-position and -CONHWN(R1)(R2) at 2-position, N-H]

in which $R_1$ and $R_2$ are lower alkyl groups, such as the methyl, ethyl, propyl or isopropyl group; W is an alkylene group of 2-4 carbon atoms, such as the ethylene, propylene, methyl ethylene or 2-methyl propylene group; and A is a lower alkoxy group, such as methoxy, ethoxy, isopropoxy or butoxy.

The substituted carboxamide indoles are produced by reacting a lower alkyl ester of 3-hydroxy-2-indolyl formic acid with a lower alkylating agent in acetone in the presence of potassium carbonate, treating the resulting reaction product with the required disubstituted diamine in boiling toluene, recovering the alcohol formed in the course of the reaction, expelling the solvent, acidifying, reprecipitating the base by adding an alkali to the acid solution and forming a salt of the carboxamide by reacting in an inert solvent an acid with the dissolved base. For the hydrochloride, for instance, a stream of gaseous dry hydrogen chloride is caused to pass into an isopropyl alcohol solution of the base.

For example, the reacting of the preparation of the 3-methoxyindole - 2 - N-(diethylaminoethyl) carboxamide is indicated as follows:

[structure: 3-hydroxyindole-2-COOCH3] —dimethyl sulfate→ (acetone + potassium carbonate)

[structure: 3-methoxyindole-2-COOCH3] + diethylaminoethylamine —heat→ (in toluene)

[structure: 3-methoxyindole-2-CONHCH2CH2N(C2H5)2]

To obtain the corresponding indolines from the substituted carboxamide indoles, hydrogenation is effectuated in an autoclave under pressure and heat in the presence of a known catalyst such as platinum or palladium carbon in an inert solvent like alcohol. The solvent is expelled after hydrogenation and the residue is recrystallized. Salts of the substituted indoline base may be obtained by treating the base in solution in an inert solvent with the required acid. To obtain the hydrochloride, for example, the base is dissolved in isopropyl alcohol and a current of gaseous dry hydrogen chloride is passed into the alcoholic solution.

The substituted carboxamide indoles, the corresponding indolines and their salts of this invention possess significant pharmacological properties and may be used for the treatment of emesis associated with many conditions, such as pregnancy and seasickness, and behavior disturbances. For this purpose, the substituted indoles, substituted indolines or their salts may be incorporated in or combined with pharmaceutically acceptable carriers.

Examples of the preparation of specific substituted indoles and a corresponding substituted indoline are as follows:

PREPARATION I 3-methoxyindole-2-N-(diethylaminoethyl)-carboxamide hydrochloride 91 grams of methyl-2-methoxyindole-2-carboxylate and 103 grams of diethylaminoethylamine are dissolved in 160 cc. of toluene. The solution is heated to boiling, and the methanol formed in the course of the reaction, which requires 22 hours, is removed.

The resulting 3-methoxyindole-2-N-(diethylaminoethyl) carboxamide is dissolved in about 500 cc. of water, is acidified and the aqueous acid solution extracted with ether. The base is precipitated by the addition of ammonia to the acid solution, is filtered and recrystallized in 95% ethanol. There are obtained 102 g. of a bright yellow product having a melting point of 117–118° C. The hydrochloride of that base is prepared by dissolving the base in isopropyl alcohol and passing into that solution 13 g. of gaseous dry hydrogen chloride. There are obtained 111 grams of 3-methoxyindole-2-N-(diethylaminoethyl) carboxamide hydrochloride having a melting point of 173–174° C.

PREPARATION II 3-ethoxyindole-2-N-(diethylaminoethyl)-carboxamide hydrochloride 124 grams of ethyl-3-ethoxyindole-2-carboxylate and 126 grams of diethylaminoethylamine are boiled with 190 cc. of xylene for 22 hours. The alcohol formed in the course of the reaction is removed. The reaction product is dissolved in about 500 cc. of water, acidified, and the aqueous acid solution is extracted with ether. The base is precipitated by the addition of ammonia. By recrystallization in 95% ethanol, 125 grams of a white product is obtained, having a melting point of 141–142° C.

The hydrochloride of the base is prepared by dissolving this base in isopropyl alcohol and passing through it 15 grams of gaseous dry hydrogen chloride. There are obtained 132 grams of 3-ethoxyindole-2-N-(diethylaminoethyl) carboxamide hydrochloride having a melting point of 160–161° C.

PREPARATION III 3-ethoxyindoline-2-N-(diethylaminoethyl) carboxamide hydrochloride 50 grams of 3-ethoxyindole-2-N-(diethylaminoethyl) carboxamide are dissolved in 200 cc. of 95% ethanol and hydrogenated in an autoclave under heat and pressure with 10 grams of palladium carbon as a catalyst. After hydrogenation is terminated, the catalyst is filtered, the alcohol evaporated and the residue recrystallized in isopropyl alcohol. There are obtained 40 grams of product, having a melting point of 90–91° C. The hydrochloride of that base is prepared by dissolving the base in isopropyl alcohol and passing through a current of gaseous hydrogen chloride. There are obtained 34 grams of 3-ethoxyindoline-2-N-(diethylaminoethyl) carboxamide hydrochloride having a melting point of 151–152° C.

If a pharmaceutically acceptable salt other than the hydrochloride is desired, the substituted indole carboxamide or substituted indoline carboxamide base is reacted preferably under anhydrous conditions with the required acid. For example, such base may be reacted with sulfuric acid, tartaric acid or phosphoric acid.

The toxicities studied in mice establish that the compositions of the preparation each have a toxicity suitable for therapeutic use. The toxicities of the three compositions are given in the following table:

| Composition | $DL_{50}$ in mg. per kg. of body weight |
|---|---|
| Composition #1, 3-methoxyindole-2-N-(diethylaminoethyl) carboxamide | 40 |
| Composition #2, 3-ethoxyindole-2-N-(diethylaminoethyl) carboxamide | 37.5 |
| Composition #3, 3-ethoxyindoline-2-N-(diethylaminoethyl) carboxamide | 34 |

The following table shows the intraperitoneal and subcutaneous toxicities of such compositions.

| Composition | $DL_{50}$ (mouse) in mg. per kg. of body weight | |
|---|---|---|
| | Intraperitoneally | Subcutaneously |
| Composition #1, 3-methoxyindole-2-N-(diethylaminoethyl) carboxamide hydrochloride | 215 | 273 |
| Composition #2, 3-ethoxyindole-2-N-(diethylaminoethyl) carboxamide hydrochloride | 195 | 320 |
| Composition #3, 3-ethoxyindoline-2-N-(diethylaminoethyl) carboxamide hydrochloride | 180 | 420 |

The methods of this invention are effective in the lessening or removal of nervous tensions. For example, the salt of 3-ethoxyindole-2-N-(diethylaminoethyl) carboxamide and 3-ethoxyindoline-2-N-(diethylaminoethyl) carboxamide have striking antifibrillating characteristics. When compared with procaine amide, 3-ethoxyindole-2-N-(diethylaminoethyl) carboxamide hydrochloride is about three times more active than procaine amide, while 3-ethoxyindoline-2-N-(diethylaminoethyl) carboxamide hydrochloride is approximately eight times more active than procaine amide.

The central nervous system depressive properties of the compounds utilized in the methods of this invention is illustrated in the following table giving these properties of the compounds of the three preparations in this application. The table of these properties is as follows:

CENTRAL DEPRESSIVE PROPERTIES OF COMPOUNDS OF PREPARATIONS 1, 2 AND 3

| Test | Effective doses $DL_{50}$ in mg. per kg. of body weight of preparations 1, 2, and 3 | | |
|---|---|---|---|
| | 1 | 2 | 3 |
| Rotarod in mouse | | 54 [1] base | [1] 80. |
| Antimorphine in mouse (suppression of Straub phenomenon) | 293 [4] Base | 236 [2] base | |
| Action on spontaneous motility in mouse | 47.9 [1] base | 74.1 [1] base | 43.8 [1] Base. |
| Catalepsy in rat | [2] 86 | None | |
| Tremorine in mouse | 0.66 [1] Base | 98 [1] Base | 28.2 [1] Base. |
| Mescaline in mouse | [1] 37 | 12.8 [1] Base | [1] 35. |
| Nicotine test (Longo and Bovet) in rabbit | 4 (I.V.) [3] | | |
| Traction in mouse | [1] 95 | 66.9 [2] | [2] 60. |

[1] Intraperitoneally administered.
[2] Subcutaneously administered.
[3] Intravenously administered.
[4] Orally administered.

The preparations utilized in the methods of this invention or salts thereof, such as the hydrochloride salt, can be administered in the form of:

(a) Sugar coated 25 mg. tablets at the rate of 6 to 8 daily;

(b) Injectible ampoules or aqueous solutions for use in aerosol or other sprays in dosages of 100 mg. per 2 cc. of solution at the rate of 2 to 4 doses daily;

(c) Suppositories of 100 mg. at the rate of 2 to 4 daily;

(d) Granulated sucrose for babies at 10 mg. per dose, equivalent to one full level teaspoon (about 4 g.);

(e) Sugar syrup for babies at a dosage of 10 mg. per teaspoon of 5 cc.

The duration of the treatment and the dosages utilized vary with the illness treated. With mammals having the weight span of man, the desirable daily dosage is in the range of 10 to 800 mg. Such treatment and dosage in a particular situation would be determined by a professional skilled in the art of the prevention, cure and alleviation of disease, illness and injury of mammals.

What is claimed is:

1. The method of treating nervous tensions in mammals, said method comprising administering to a mammal requiring such treatment 1 to 5 mg. per kg. of body weight of said mammal of a compound selected from the group consisting of substituted indole carboxamides, non-toxic acid addition salts of said indole carboxamides, corresponding indoline carboxamides and non-toxic acid addition salts of said corresponding indoline carboxamides, said substituted indoles being of the formula:

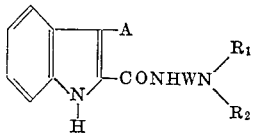

in which A is lower alkoxy; W is alkylene of 2-4 carbon atoms; and $R_1$ and $R_2$ are lower alkyl.

2. The method in accordance with claim 1, in which the daily dosage is 10 mg. to 800 mg. of the compound.

3. The method in accordance with claim 1, in which a single dosage is 10 mg. to 160 mg. of the compound.

4. The method in accordance with claim 1, in which the compound administered is a non-toxic acid addition salt of 3 - methoxyindole - 2-N-(diethylaminoethyl)carboxamide.

5. The method in accordance with claim 1, in which the compound administered is a non-toxic acid addition salt of 3 - ethoxy - indole - 2 - N-(diethylaminoethyl) carboxamide.

6. The method in accordance with claim 1, in which the compound administered is a non-toxic acid addition salt of 3 - ethoxyindoline-2-N-(diethylaminoethyl)carboxamide.

References Cited
UNITED STATES PATENTS

| | | | |
|---|---|---|---|
| 2,691,025 | 10/1954 | Clinton et al. | 260—559 |
| 2,957,005 | 10/1960 | Coenen et al. | 260—319 |
| 2,980,692 | 4/1961 | Albertson | 260—319 |
| 2,986,573 | 5/1961 | Topliss et al. | 424—274 |
| 3,004,889 | 10/1961 | Kuna et al. | 424—274 |

ALBERT T. MEYERS, Primary Examiner

S. J. FRIEDMAN, Assistant Examiner

UNITED STATES PATENT OFFICE
CERTIFICATE OF CORRECTION

Patent No. 3,496,275                         February 17, 1970

Michel Leon Thominet

It is certified that error appears in the above identified patent and that said Letters Patent are hereby corrected as shown below:

Column 2, line 47, "methyl-2-methoxyindole-2-carboxylate" should read -- methyl-3-methoxyindole-2-carboxylate --.

Signed and sealed this 8th day of December 1970.

(SEAL)
Attest:

Edward M. Fletcher, Jr.
Attesting Officer

WILLIAM E. SCHUYLER, JR.
Commissioner of Patents